Feb. 14, 1928.

W. W. BIRNSTOCK 1,659,477

MODULATING VAPOR VALVE

Filed May 19, 1926

Inventor

William W. Birnstock,

By

Attorney

Patented Feb. 14, 1928.

1,659,477

UNITED STATES PATENT OFFICE.

WILLIAM W. BIRNSTOCK, OF YORK, PENNSYLVANIA, ASSIGNOR TO VAPOR HEATING COMPANY, OF YORK, PENNSYLVANIA, A CORPORATION OF PENNSYLVANIA.

MODULATING VAPOR VALVE.

Application filed May 19, 1926. Serial No. 110,212.

The present invention relates to improvements in valves, and more especially to those of the type adapted for use in vapor or steam heating systems for modulating the supply of vapor or steam to the radiators and employing a ported seat and a cooperative ported valve disk.

One of the primary objects of the invention is to provide a novel and improved valve of this kind whereby replacement of the valve disk, when such is desired, because of wear or other causes, may be accomplished quickly and with facility and without the necessity of removing the valve from the radiator and supply pipe to which it is connected.

Another object of the invention is to provide a valve of this type which is so constructed that the ported seat with which the valve disk cooperates may be ground into the valve body or casing to insure a leak-proof fit therein and it may be readily reground therein should such become desirable or necessary.

Other objects of the invention are to provide a seat for the valve disk which embodies a sleeve through which the valve stem extends whereby the valve disk and its stem are accurately guided and centered, and to provide the stem guiding sleeve with a bore or chamber to contain and enclose a spring which serves to hold the valve disk on its seat, the enclosing of the spring by the sleeve excluding vapor or steam from the spring and thereby protecting it from corrosion or other deteriorating influences.

Further objects are to provide a valve of this type which avoids the necessity of a stuffing box or packing to prevent leakage around the stem, to provide a valve of this type which may be cast, machined and finished inexpensively and with facility, and which can be assembled and disassembled quickly and with facility.

To these and other ends the invention consists in certain improvements and combinations and arrangements of parts, all as will be hereinafter more fully described, the features of novelty being pointed out particularly in the claims at the end of the specification.

In the accompanying drawing:—

Similar parts are designated by the same reference characters in the several views.

Figure 1:
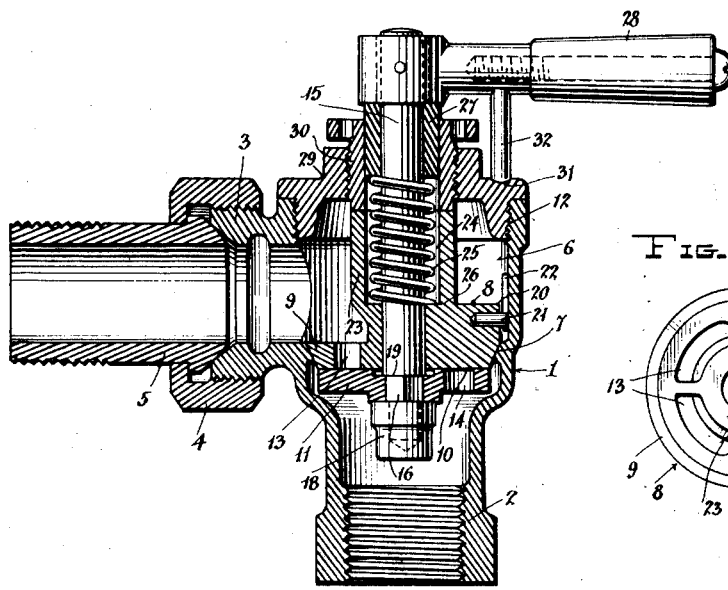
Figure 1 represents a section taken axially through a valve constructed in accordance with the preferred embodiment of the invention.
Figure 3:
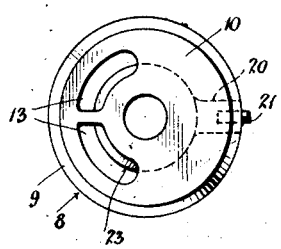
Figure 3 is a bottom plan view of the valve seat.
Figure 2:
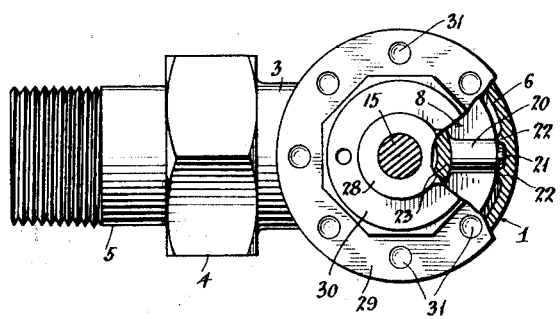
Figure 2 is a top plan view of the valve, partly broken away.
Figure 4:
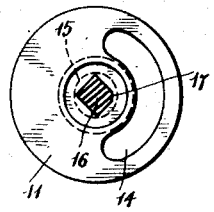
Figure 4 is a top plan view of the valve disk.

Valves constructed in accordance with the present invention may be used for various purposes where it is desired to modulate or regulate the flow of a heating or other fluid. The invention, however, is particularly adapted for use on radiators of vapor or steam heating systems for the purpose of regulating the flow of the heating medium to the radiator and thus modulating the heating effect obtained therefrom. The preferred embodiment of the invention is shown in the accompanying drawing and will be hereinafter described in detail, but it is to be understood that the invention is not restricted to the precise construction shown as equivalent constructions are contemplated and such will be included within the scope of the claims.

In the present instance, the valve comprises a casing 1 which may be cast from brass or other suitable metal, this casing having a branch 2 at the bottom which is threaded to receive the pipe which supplies vapor or steam to a radiator, and another branch 3 leads from a side of the valve casing and is threaded or otherwise adapted for connection to the radiator, it being shown in the present instance as threaded to receive a nut 4 which joins the valve to a nipple 5, which latter may be threaded into the radiator. In using the valves on radiators it is preferable that they be of angle form substantially as has been described.

The body of the valve casing is formed with a chamber 6 which is adapted to provide communication between the lower branch 2 and the lateral branch 3 of the valve. A joint-forming surface 7 is formed within the casing at the bottom of the chamber 6, this surface being annular and preferably tapered or conical. A seat member 8 is placed within the valve casing, it having an annular lower end 9 the bottom face 10 of which is flat and finished to form a seat for a valve disk 11. The periphery of the portion 9 of the valve member is tapered to fit the surface 7 in the casing, and in order to produce a fluid-tight fit at this joint the seat member is ground or lapped against the surface 7 in the casing. In order to enable this grinding or lapping operation to be performed, the seat member is capable of insertion into and removal from the valve casing through an opening 12 in the top of the valve casing, this opening being larger in diameter than the lower portion 9 of the seat member. The lower or seat portion 9 is formed with one or more fluid-controlling ports 13 and the valve disk 11 is formed with one or more ports 14, a single port being shown in the present instance, portions of which may be brought into communication with the ports 13 of the seat or the port in the valve disk may be brought into full register with the ports 13, or it may be carried completely out of communication therewith by appropriate rotation of the valve disk. The valve disk is fixed to the lower end of a stem 15, the stem being preferably provided at its lower end with a squared or angular portion 16, one corner of which is preferably flattened, as at 17, and the center of the valve disk is formed with a hole of corresponding shape so that the valve disk may be fitted in proper position on the stem and connected to rotate therewith. A cap nut 18 is shown threaded on the lower end of the stem to lock the valve disk thereon against a shoulder 19.

In order to enable the seat member to be rotated during the operation of grinding or lapping it into the valve casing and to insure proper positioning of the seat member and prevent its rotation when the valve is in working condition so that the ports 13 therein will occupy the proper position relatively to the port 14 in the valve disk to correspond with different settings of the stem 15, the seat member is formed at one side with a lug 20 which extends radially to but not beyond the circumference of this member which seats on the surface 7, and a pin or projection 21 is removably inserted into this lug and arranged to occupy a position between a pair of ribs 22 which are formed on the inner wall of the valve casing and extend vertically therein. By this arrangement, the pin 21 may pass vertically between the ribs 22 and thus avoid interference with the insertion or removal of the valve member, but by removing the pin 21 while the valve member is removed from the valve casing, the seat member may be rotated against the surface 7 of the valve casing incident to the grinding or lapping of the seat member into the valve casing. After the seat member has been properly fitted to the surface 7, the pin 21 is inserted in the lug 20 and when the seat member is replaced in the casing the pin 21 is arranged to enter between the ribs 22 and the pin will thereby serve to properly position the ports 13 around the stem 15 and it will prevent rotation of the seat member, which, if it occurred, would cause the ports 13 to become displaced. By so constructing the seat member that it may be removed through the top of the valve casing, it will be understood that the valve disk 11 and its retaining nut 18 will be rendered accessible so that the valve disk may be replaced by a new one, or it may be ground or lapped against the seat formed by the bottom of the seat member.

The lower end of the seat member fits around the stem 15 and it thereby serves to center the lower end of the stem and the valve disk. The seat member has an upwardly extending sleeve-like portion 23 which forms a chamber 24 around the valve stem, and this chamber is adapted to contain a coiled compression spring 25, the lower end of which bears on the shoulder 26 on the valve seat at the bottom of the chamber 24 and the upper end of the spring bears against a sleeve or cushion 27, the upper end of the latter abutting against the hub of a handle 28 which is fixed to the upper end of the valve stem and serves to rotate the latter to set the ported valve disk 11 in different adjusted positions. The spring 25 acts through the sleeve 27 and the handle to force the valve stem upwardly, thus drawing the valve disk 11 into working engagement with the seat on the bottom of the member 8 and retaining the valve disk in such position.

The opening in the top of the valve casing is closed by a cap 29 which may be threaded therein to facilitate its application and removal, and this cap is threaded or otherwise formed to receive a bushing 30, the lower end of which is adapted to bear against and form a fluid-tight joint with the upper end of the sleeve-like portion 23 of the seat member. This bushing 30 serves to center the sleeve 27 therein, the sleeve 27, in turn, centering the valve stem 15, and the bushing 30 is centered by the cap 29 when the latter is inserted into the valve casing. The fitting of the valve disk 11 against the seat on the bottom of the seat member 8 will prevent leakage of fluid upwardly along the valve stem, and the fluid-tight joint formed between the lower end of the bushing 30 and the upper end of the sleeve-like portion 23 of the seat member will prevent leakage of fluid into the chamber 24. The necessity of employing a stuffing box or packing for the valve stem is thereby avoided. It will be understood that the bushing 30 through its engagement with the upper end of the seat member serves to force the lower tapered portion of the seat member into fluid-tight engagement with the surface 7 and to retain it in such position. However, by loosening the bushing 30 and unscrewing and removing the cap 29, the seat member 8, valve disk 11, locking nut 18, cap 29, bushing 30, sleeve 27 and handle 28, together with the stem 15, are removable as a unit for inspection, repair or replacement of any of these parts without the necessity of disconnecting the valve from either the supply pipe or the radiator.

The top of the cap 29 may be formed with a suitable number of appropriately placed recesses or depressions 31 and the handle 28 may be provided with a prong or stud 32, the lower end of which is adapted to seat in the different recesses and thus hold the valve in different set poistions as may be required to effect the desired modulation of the heating effect of the radiator.

By forming the seat for the valve disk on a seat member which is removably inserted through the top of the valve casing, the manufacture of the valve is facilitated as the valve casing may be cast without difficulty and the valve seat and valve disk, together with the valve stem, may be made and assembled with facility before these parts are placed within the valve casing. Moreover, this construction enables the valve disk to be rendered accessible without disconnecting the valve from the piping or radiator, so that the valve disk may be reground against its seat or a new one substituted. The seat member may be readily ground or re-ground against its seat in the valve casing to insure a leak-proof joint therewith, and after this operation has been performed the seat member is keyed or held against rotation so that the port or ports in the seat member will occupy the proper position to agree with the different settings of the valve handle. The enclosing of the spring within a chamber so that the vapor or fluid cannot reach the spring avoids corrosion or deterioration of the spring, and the fluid-tight joint formed between the top of the seat member and the bushing which secures it in place in conjunction with the fitting of the valve disk against the bottom of the seat member prevents leakage of fluid along the valve stem without requiring the use of a stuffing box or packing.

I claim as my invention:—

1. A valve comprising a casing having a seat therein and an opening opposite thereto, a seat member therein, a valve disk cooperating with said seat member, a stem to which the valve disk is connected, said stem extending through and being guided by the seat member, and the seat member having a sleeve-like portion forming a chamber which surrounds the stem, a spring contained in said chamber and acting on the stem to hold the valve disk against the seat member, a cap fitted to the casing to close said opening therein, and a member threaded in said cap and operative to hold the seat member against its seat and to form a fluid-tight joint with an end of said sleeve-like portion of the seat member and thus close the spring-containing chamber.

2. A valve comprising a casing having an opening therein, a seat member capable of insertion into the casing through said opening, a valve disk rotatably engaging the seat member, a stem extended through and guided by the seat member, the seat member having a sleeve-like portion projecting therefrom which surrounds the stem and forms a chamber, a spring contained in said chamber and operative at one end against the seat member, a sleeve on the stem against which the other end of said spring acts to hold the valve disk against the seat member, a bushing surrounding said sleeve and abutting against the terminal of the projecting sleeve-like portion of the seat member to form a fluid-tight closure between said spring-containing chamber and the interior of the casing, and a cap in which said bushing is threaded for adjustment relatively to the cap and axially of the stem, the cap being removably fitted to and closing said opening in the casing.

3. A valve comprising a casing having a seat therein and an opening opposite to and of a diameter at least as large as said seat, a seat member capable of insertion and removal through said opening and having a disk-like portion adapted to form a fluid-tight joint with said seat in the casing, one side of said disk-like portion having a valve-engaging surface thereon and the opposite side of said disk-like portion having a sleeve projecting axially therefrom, a valve disk rotatably fitted against said valve-engaging surface of the disk-like portion of the seat member and having an operating stem extending through said sleeve on the seat member, a cap separate from the seat member and fitted to the casing to close said opening therein, and a bushing threaded in said cap and operative from the exterior thereof to bear against said sleeve on the seat member and thus hold the latter in engagement with the seat in the casing.

In testimony whereof I have hereunto set my hand.

WILLIAM W. BIRNSTOCK.